US011029922B2

(12) United States Patent
Chabrier et al.

(10) Patent No.: US 11,029,922 B2
(45) Date of Patent: Jun. 8, 2021

(54) METHOD FOR DETERMINING A MODULAR INVERSE AND ASSOCIATED CRYPTOGRAPHIC PROCESSING DEVICE

(71) Applicant: IDEMIA France, Courbevoie (FR)

(72) Inventors: Thomas Chabrier, Courbevoie (FR); Gilles Piret, Courbevoie (FR)

(73) Assignee: IDEMIA FRANCE, Courbevoie (FR)

( * ) Notice: Subject to any disclaimer, the term of this patent is extended or adjusted under 35 U.S.C. 154(b) by 109 days.

(21) Appl. No.: 16/426,824

(22) Filed: May 30, 2019

(65) Prior Publication Data

US 2019/0377554 A1 Dec. 12, 2019

(30) Foreign Application Priority Data

Jun. 8, 2018 (FR) ...................................... 1855043

(51) Int. Cl.
*G06F 7/72* (2006.01)
*H04L 9/30* (2006.01)

(52) U.S. Cl.
CPC .............. *G06F 7/721* (2013.01); *G06F 7/723* (2013.01); *G06F 7/725* (2013.01); *G06F 7/727* (2013.01); *H04L 9/302* (2013.01)

(58) Field of Classification Search
CPC . G06F 7/721; G06F 7/723–727; H04L 9/002; H04L 9/003; H04L 9/005; H04L 9/30006; H04L 9/302
See application file for complete search history.

(56) References Cited

U.S. PATENT DOCUMENTS

2002/0174155 A1* 11/2002 Hars ....................... G06F 7/721 708/491
2003/0147529 A1* 8/2003 Perkins .................. G06F 7/721 380/30
2008/0201398 A1 8/2008 Meyer

FOREIGN PATENT DOCUMENTS

EP 1 891 512 A1 2/2008

OTHER PUBLICATIONS

A.C Aldaya et al., SPA vulnerabilities of the binary Euclidean algorithm, Sringer-Verlag, 2016 (Year: 2016).*
A. Byrne et al., Comparison of Simple Power Analysis Attack Restistant Algorithms for an Elliptic Curve Cryptosystem, Journal of Computers, vol. 2, No. 10, 2007 (Year: 2007).*
(Continued)

*Primary Examiner* — Aimee Li
*Assistant Examiner* — Emily E Larocque
(74) *Attorney, Agent, or Firm* — Nixon & Vanderhye

(57) ABSTRACT

In a method for determining the modular inverse of a number, successive iterations are applied to two pairs each including a first variable and a second variable, such that at the end of each iteration and for each pair, the product of the second variable and of the number is equal to the first variable modulo a given module. Each iteration includes at least one division by two of the first variable of a first pair or of a second pair, or a combination of the first variable of the first pair and of the first variable of the second pair by addition or subtraction. At least some of the iterations including a combination by addition or subtraction include a step of storing the result of the combination in the first variable of a pair determined randomly from among the first pair and the second pair. An associated cryptographic processing device is also described.

20 Claims, 3 Drawing Sheets

(56) References Cited

OTHER PUBLICATIONS

Laszlo Hars: "Modular Inverse Algorithms Without Multiplications for Cryptographic Applications", EURASIP Journal on Embedded Systems, vol. 2006, Jan. 1, 2006 (Jan. 1, 2006), pp. 1-13, XP055570944, New York, NY, US, ISSN: 1687-3955, DOI, algorithm 1, section 3.1.

Alejandro Cabrera Aldaya et al: "Side-channel analysis of the modular inversion step in the RSA key generation algorithm : SCA of the Modular Inversion Step in the RSA Key Generation Algorithm", International Journal of Circuit Theory and Applications, vol. 45, No. 2, Dec. 12, 2016 (Dec. 12, 2016), pp. 199-213, XP055571735, 0098-9886, DOI: 10.1002/cta.2283, section 3.

J. Stein, "Computational Problems Associated with Racah Algebra", Journal of Computational Physics 1, pp. 397-405 (1967).

Onur et al.: "On the Power of Simple Branch Prediction Analysis", Applied Security Research Group, The Center for Computational Mathematics and Scientific Computation Faculty of Science and Science Education, Information Security Research Center, Istanbul Commerce University.

J.-S. Coron1 et al.: "Fault Attacks and Countermeasures on Vigilant's RSA-CRT Algorithm", University of Luxembourg, Oberthur Technologies, FDTC—Aug. 21, 2010.

Lorencz, Robert, "New Algorithm for Classical Modular Inverse," CHES 2002, LNCS 2523, pp. 57-70, 2003.

FR Search Report, dated Mar. 20, 2019, from corresponding FR 1855043 application.

* cited by examiner

METHOD FOR DETERMINING A MODULAR INVERSE AND ASSOCIATED CRYPTOGRAPHIC PROCESSING DEVICE

The present application claims priority from French patent application No. 18 55 043 filed on Jun. 8, 2018, which is incorporated herein by reference.

FIELD OF THE INVENTION

The present invention generally relates to the field of cryptographic processing using modular arithmetic.

It relates more specifically to a method for determining a modular inverse and an associated cryptographic processing device.

BACKGROUND OF THE INVENTION

It has already been proposed, for example in the article, "*Algorithm for Classical Modular Inverse*", by Robert Lórencz in Cryptographic Hardware and Embedded Systems—CHES 2002, 4th International Workshop, pp. 57-70, volume 2523 of LNCS, Springer, a method for determining the modular inverse of a number, wherein successive iterations are applied to two pairs, each comprising a first variable and a second variable such that at the end of each iteration and for each pair, the product of the second variable and of said number is equal to the first variable modulo a given module (the two pairs comprising a first pair and a second pair).

In such a process, it is provided that each iteration includes either a division by two of the first variable of the first pair or of the second pair, or a combination of the first variable of the first pair and of the first variable of the second pair by addition or subtraction.

The respective values of the first variables thus decrease until one of them is equal to 1, in which case, due to the relationship stated above between the first variable and the second variable of each pair, the associated second value is equal to the modular inverse sought.

An implementation of such a method (for example, in the scope of a cryptographic algorithm) without specific precaution is not however protected against side-channel attacks. Indeed, the observation of a processor implementing the method can make it possible to detect information on data successively handled and, after repeated observation of a great number of implementations of the method, to deduct the processed number from it.

SUMMARY OF THE INVENTION

In this context, the present invention provides a method for determining a modular inverse of a number, wherein successive iterations are applied to two pairs, each comprising a first variable and a second variable, such that at the end of each iteration and for each pair, the product of the second variable and of said number is equal to the first variable modulo a given module, the two pairs comprising a first pair and a second pair, each iteration including at least one division of the first variable of the first pair or of the second pair by two, or a combination of the first variable of the first pair and of the first variable of the second pair by addition or subtraction, wherein at least some of the iterations including a combination by addition or subtraction comprise a step of storing a result of said combination in the first variable of a pair determined randomly from among the first pair and the second pair.

The variable storing the result of the abovementioned combination can thus differ from one implementation of the method to another (i.e. from one implementation of the cryptographic algorithm using this method to another), such that the later processing will differ according to the implementation in question.

This variability of the functioning is furthermore introduced for several of the iterations including such a combination, such that the processing carried out will be clearly modified from one implementation to another and cannot therefore be used by an attacker to deduce information about the data handled.

Other non-limiting and advantageous characteristics of the method according to the invention, taken individually or according to any technically possible combinations, are as follows:

when the number of iterations performed is greater than a threshold, each iteration including a combination by addition or subtraction comprises a step of storing the result of said combination in a variable withgreater absolute value from among the first variable of the first pair and the first variable of the second pair;

the method comprises a prior step of determining the threshold by random draw;

for at least one iteration comprising a combination by addition or subtraction, the combination is made by addition if the first variable of the first pair and the first variable of the second pair have opposite signs, and by subtraction if the first variable of the first pair and the first variable of the second pair have the same sign;

each iteration comprising a division of the first variable of a given pair by two comprises, if the second variable of said given pair is even, a step of dividing the second variable of said given pair by two, and, if the second variable of said given pair is odd, a step of determining a sum of the second variable of said given pair and of the module, and a step of dividing said sum by two;

the method comprises a step of storing a random value in an additional variable, and, in at least one iteration, a division of the additional variable by two is performed if the additional variable is even, and, if the additional variable is odd, a sum of the additional variable and of the module is determined and a division of this sum by two is performed;

each iteration including a combination by addition or subtraction comprises a corresponding (in practice similar) combination of the second variable of the first pair and of the second variable of the second pair.

The invention also proposes a cryptographic processing device, comprising a unit for determining the modular inverse of a number designed to apply successive iterations to two pairs each comprising a first variable and a second variable such that at the end of each iteration and for each pair, the product of the second variable and of said number is equal to the first variable modulo a given module, the two pairs comprising a first pair and a second pair, wherein said unit is designed to activate, at each iteration, at least one division block for dividing by two the first variable of the first pair or of the second pair, or a combination block for combining the first variable of the first pair and the first variable of the second pair by addition or subtraction, wherein said unit is designed, for at least some of the iterations, to store a result produced by the combination block in the first variable of a pair determined randomly from among the first pair and the second pair.

The unit for determining the modular inverse can furthermore be designed, when the number of iterations performed is greater than a threshold, to store the result produced by the combination block, in a variable with greater absolute value from among the first variable of the first pair and the first variable of the second pair.

The combination block can in practice be designed to perform the combination by addition if the first variable of the first pair and the first variable of the second pair have opposite signs (i.e. if a product of the first variable of the first pair and of the first variable of the second pair is negative), and by subtraction if the first variable of the first pair and the first variable of the second pair have the same sign (i.e. if said product of the first variable of the first pair and of the first variable of the second pair is positive).

The unit for determining the modular inverse is, for example, implemented in practice by means of a processor and computer program instructions stored in a memory (associated with the processor) and which can be executed by the processor to implement, for example, a method such as described below in reference to FIG. 2.

The division block can, in this case, itself also be implemented by means of the processor and computer program instructions stored in the memory and which can be executed by the processor to implement, for example, steps such as those in FIGS. 3 and 4 described below.

Likewise, the combination block can thus be implemented by means of the processor and computer program instructions stored in the memory and which can be executed by the processor to implement, for example steps such as those of FIG. 6 described below.

BRIEF DESCRIPTION OF THE DRAWINGS

The following description in light of the appended drawings, given as non-limiting examples, will provide understanding of what the invention involves, and how it can be achieved.

In the appended drawings.

DETAILED DESCRIPTION OF EMBODIMENTS OF THE INVENTION

Figure 1:
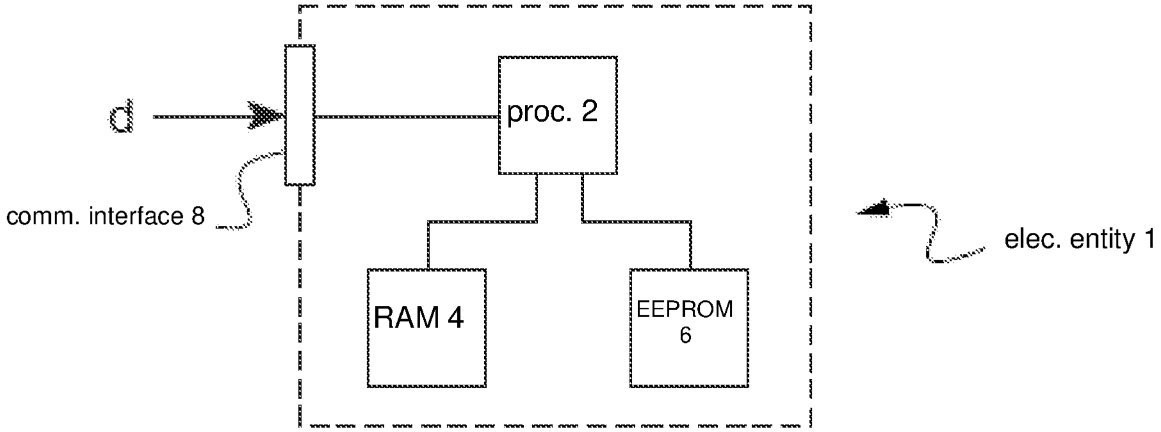
FIG. 1 schematically represents the main elements of an electronic entity within which the invention is implemented.

FIG. 1 schematically represents the main elements of an electronic entity 1 within which the invention is implemented. This electronic entity is, for example, a microcircuit card, such as a universal integrated circuit card (or UICC). In a variant, it could be a secure element (or SE)—for example a secure microcontroller; such a secure element is, for example, integrated to a handheld electronic device, such as a communication terminal or an electronic passport. According to another variant also, the electronic entity 1 could be a computer or a hardware security module (or HSM).

The electronic entity 1 comprises a processor 2 (here, a microprocessor), a random access memory 4 and a rewritable non-volatile memory 6 (for example, of the EEPROM (Electrically Erasable and Programmable Read-Only Memory) type). The electronic entity 1 could possibly further comprise a read-only memory. The random access memory 4 and the rewritable non-volatile memory 6 (as well as, if necessary, the read-only memory) are each linked to the processor 2 such that the processor 2 can read or write data in each of these memories.

One of these memories, for example, the rewritable non-volatile memory 6, stores computer program instructions, some of which make it possible to implement the method described below in reference to FIG. 2, when these instructions are executed by the processor 2.

The memories 4, 6 also store data representative of values used during the implementation of this method.

The electronic entity 1 is designed (here, using some of the instructions stored in a memory 4, 6 of the electronic entity 1 and which can be executed by the processor 2 of the electronic entity) to implement a cryptographic algorithm comprising a modular inversion. The electronic entity 1 is therefore a cryptographic processing device.

The electronic entity 1 further comprises a communication interface 8 for communicating with external electronic devices. In the case described here, where the electronic entity 1 is a microcircuit card, the communication interface 8 comprises, for example, contacts flush with a face of the microcircuit card. In a variant, the communication interface 8 could be produced by a contactless communication module. Generally, the communication interface 8 can be a (wired or wireless) communication module for communicating (by wired or wireless communication) with another electronic entity.

In some embodiments, the processor 2 can thus receive data d from the other electronic entity via the communication interface 8 and/or transmit other data, for example, a result of applying the abovementioned cryptographic algorithm, to the other electronic entity via the communication interface 8.

In other embodiments, the result of applying the abovementioned cryptographic algorithm is stored in a memory, for example the rewritable non-volatile memory 6, of the electronic entity 1.

According to a first embodiment example which can be considered, the cryptographic algorithm is an algorithm for generating keys, for example in the scope of an asymmetric encryption scheme (such as RSA). In this context, the modular inversion operation is applied to the public exponent which forms part of the public key (public exponent which can then be used as an exponent to encrypt a message or verify the signature of a message) in order to obtain the associated private key (which can then be used as an exponent to decrypt a message or sign a message), or a component of the associated private key.

According to a second embodiment example which can be considered, the cryptographic algorithm is a cryptographic algorithm (for example, signature or signature verification) on an elliptic curve, such as the ECDSA (Elliptic Curve Digital Signature Algorithm). In such cryptographic algorithms, the modular inversion operation is applied to a scalar number; the modular inverse thus determined can thus be applied at a point of the elliptic curve by scalar product.

According to a third embodiment example which can be considered, the cryptographic algorithm uses a multiplicative masking mechanism (i.e. a multiplication of a value to be processed by a random mask) in order to protect the algorithm against side-channel attacks. The modular inverse determined by the modular inversion operation can thus be multiplied by a masked value in the scope of an operation of demasking this value.

Figure 2:
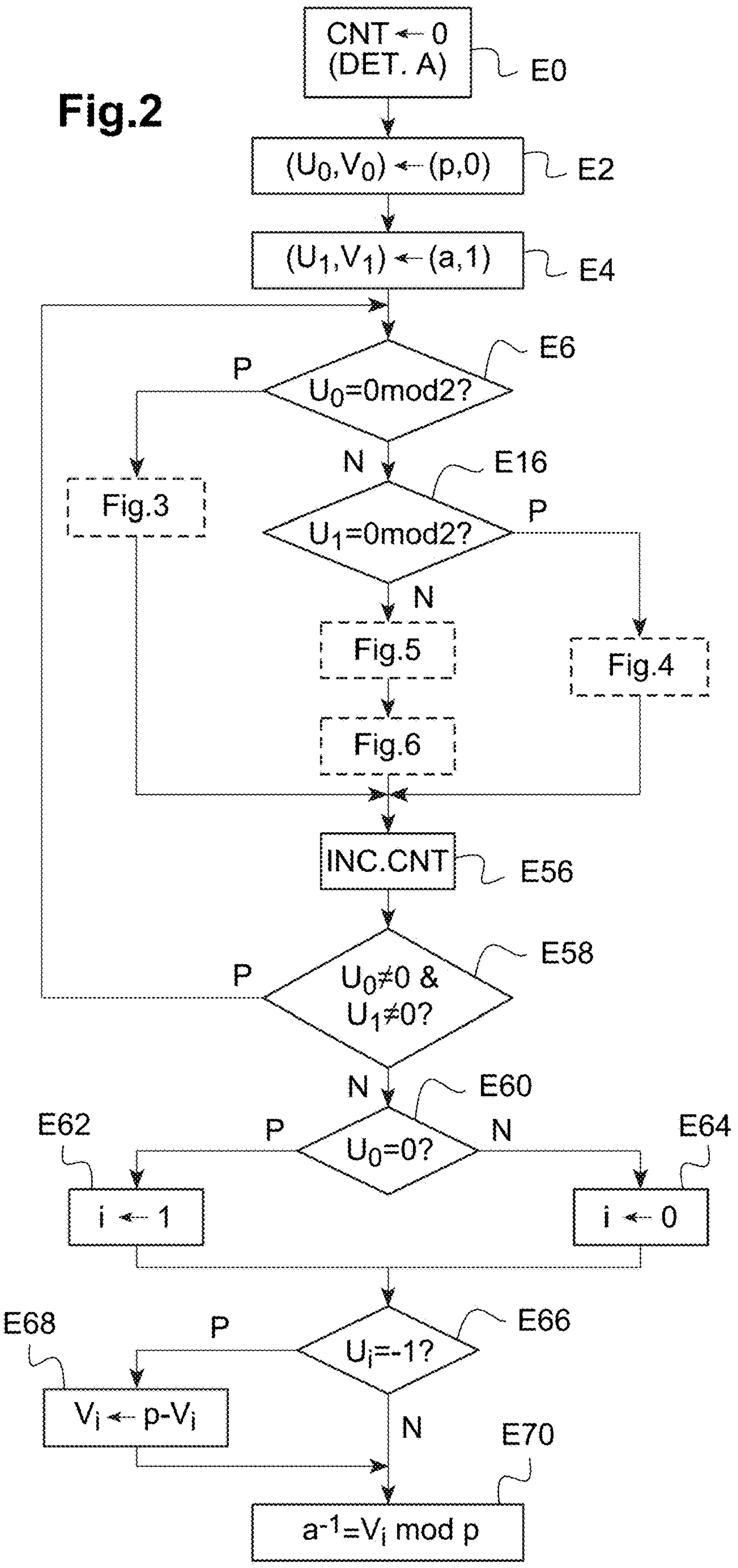
FIG. 2 represents an example of a method for determining an inverse according to the invention.

FIG. 2 represents, in the form of a flowchart, a modular inverse determination method example according to the invention.

As explained below, this method makes it possible to determine the modular inverse of a number a in modular arithmetic of module p, i.e. to determine the value of: $a^{-1}$ mod p. (Generally, it is provided that the module p is strictly greater than 2 and that the module p and the number a are prime to each other. In practice, in some embodiments, the module p is a prime number and/or the number a is strictly less than the module p.)

As already indicated, the number a can be the public exponent of a public key of an asymmetric encryption scheme (for example, of RSA type) and the method for determining the modular inverse is thus implemented in the scope of determining the private key associated with the public key (cryptographic algorithm for generating keys).

In this same context (cryptographic algorithm for generating keys in an asymmetric encrypting scheme such as RSA), the method for determining the modular inverse can be implemented for calculating a key parameter $i_a=a^{-1}$ mod p, where a is a secret factor of the RSA module (these secret factors being generally referenced p and q).

In a variant, the number a can be a scalar in the scope of a cryptographic algorithm on an elliptic curve, the modular inverse obtained thus possibly being applied to a point of the elliptic curve by means of a scalar product (directly or after multiplication by at least one other scalar).

According to another variant, also in the scope of a cryptographic algorithm on an elliptic curve, the method for determining the modular inverse is applied to the third coordinate (generally referenced z) of a point of the curve in projective coordinates during a conversion into affine coordinates.

According also to another variant, the number a can be a multiplicative mask; the modular inverse obtained can thus be applied by multiplication to a masked item of data handled in the scope of the cryptographic algorithm in question.

In another use case, the method for determining the modular inverse is implemented in the scope of a method for protecting the RSA-CRT algorithm against fault attacks, such as described in the article, "*Fault Attacks and Countermeasures on Vigilant's RSA-CRT Algorithm*", by Jean-Sébastien Coron, Christophe Giraud, Nicolas Morin, Gilles Piret, David Vigilant, in FDTC 2010 (2010 Workshop on Fault Diagnosis and Tolerance in Cryptography, FDTC 2010, Santa Barbara, Calif., USA, 21 Aug. 2010), IEEE Computer Society 2010, pp. 89-96. The number a is, in this case, a secret factor of the module N of the RSA algorithm and the module p is the mask $r^2$ which is applied to said secret factor.

The method of FIG. 2 starts in step E0 by initialisation (here, the setting to zero) of a counter CNT. The counter CNT is, for example, stored in the RAM 4 and initialised in step E0 by the processor 2.

Optionally, during this step E0, it can also be provided, to determine, by random draw, a variable A (used in the optional steps represented in FIG. 5, as described below).

The processor 2 thus initialises, in step E2, a first pair ($U_0$, $V_0$) of variables with the values (p, 0). In other words, the first variable $U_0$ of the first pair is initialised with the value of the module p and the second variable $V_0$ of the first pair is initialised with the value 0 (value of the neutral element for the addition).

The processor 2 then initialises in step E4, a second pair ($U_1$, $V_1$) of variables with the values (a, 1). In other words, the first variable $U_1$ of the second pair is initialised with the value of the number a (of which it is sought to determine the modular inverse) and the second variable $V_1$ of the second pair is initialised with the value 1 (value of the neutral element for the multiplication).

It is noted, that for each pair (i.e. for the first pair, as for the second pair), the product of the second variable $V_0$; $V_1$ and of the number a is equal to the first variable $U_0$; $U_1$ modulo the module p. Indeed:

$V_0.a=0.a=0=p$ mod $p=U_0$ mod p, $V_1.a=1.a=a=U_1$ mod p.

As explained below, this relationship will be true (for each of the two pairs) all throughout the method, at the end of each of the iterations described below.

The method thus enters into a loop (in step E6) in order to implement a plurality of iterations, as long as none of the first variables $U_0$, $U_1$ is zero.

Each of these iterations thus starts in step E6, in which the processor 2 determines if the first variable $U_0$ of the first pair has an even value (i.e. if $U_0=0$ mod 2).

In the negative (arrow N), the method continues in step E16 described below.

In the positive case (arrow P), the processor 2 proceeds to step E8 (represented in FIG. 3), to divide by 2 the content of the first variable $U_0$ of the first pair (for example, by shifting a bit towards the right, the binary representation of the first variable $U_0$), then implements step E10.

During this step E10, the processor 2 determines if the second variable $V_0$ of the first pair has an even value (i.e. if $V_0=0$ mod 2).

In the positive case (arrow P), the processor 2 proceeds to step E12 to divide by 2 the content of the second variable $V_0$ of the first pair (for example, by shifting a bit towards the right, the binary representation of this second variable $V_0$).

In the negative case (arrow N), the processor 2 first adds the module p to the content of the second variable $V_0$ of the first pair, then proceeds to divide by 2 the content (thus modified) of the second variable $V_0$ of the first pair, for example by shifting a bit towards the right, the binary representation of this second variable $V_0$ (step E14).

Indeed, it is reminded that the module p is odd (it is a prime number strictly greater than 2) and that, if the second variable $V_0$ is odd according to the test of step E10, the sum $V_0+p$ is thus even and therefore divisible by 2.

Moreover, it is noted, that the processing carried out in steps E8 to E14 make it possible to keep the relationship: $V_0.a=U_0$ mod p.

Whatever the result of the test of step E10, the method is followed by step E56 described below.

Now, step E16 is described (to which the method leads when the content of the first variable $U_0$ of the first pair is odd, see above step E6).

The processor 2 determines in step E16 if the first variable $U_1$ of the second pair has an even value (i.e. if $U_1=0$ mod 2).

In the negative (arrow N), the method is followed by step E26 described below in reference to FIG. 5.

In the positive case (arrow P), the processor 2 proceeds to step E18 (represented in FIG. 4) to divide by 2 the content of the first variable $U_1$ of the second pair (for example, by shifting a bit towards the right, the binary representation of the first variable $U_1$), then implements step E20.

During this step E20, the processor 2 determines if the second variable $V_1$ of the second pair has an even value (i.e. if $V_1=0$ mod 2).

In the positive case (arrow P), the processor 2 proceeds to step E22 to divide by 2 the content of the second variable $V_1$ of the second pair (for example, by shifting a bit towards the right, the binary representation of this second variable $V_1$).

In the negative case (arrow N), the processor 2 first adds the module p to the content of the second variable $V_1$ of the second pair, then proceeds to dividing by 2 the content (thus modified) of the second variable $V_1$ of the second pair, for example by shifting a bit towards the right, the binary representation of this second variable $V_1$ (step E24).

It is noted that steps E18 to E24 implement within the second pair ($U_1$, $V_1$), a processing identical to that implemented within the first pair ($U_0$, $V_0$) by means of steps E8 to E14.

As indicated for the first pair ($U_0$, $V_0$) above, this processing makes it possible to keep the relationship: $V_1.a=U_1 \bmod p$.

Whatever the result of the test of step E20, the method is followed by step E56 described below.

Now, step E26 is described (represented in FIG. 5) to which the method leads when the content of the first variable $U_1$ of the second pair is odd (after the test of step E16).

Figure 5:
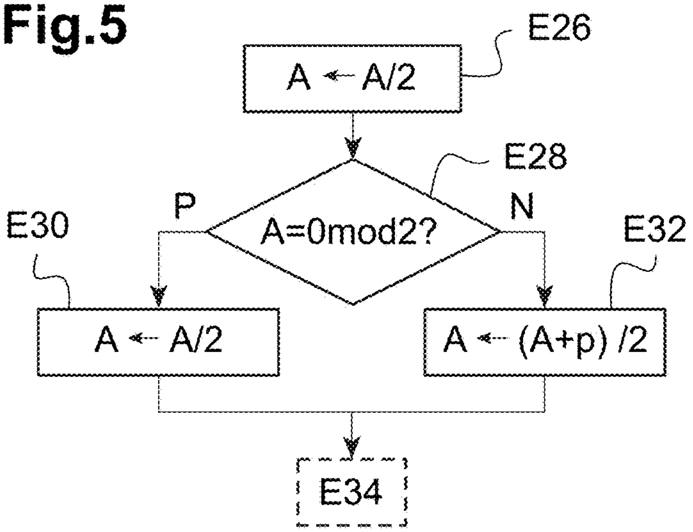
FIG. 5 represents an optional portion of the method of FIG. 2.
Figure 6:
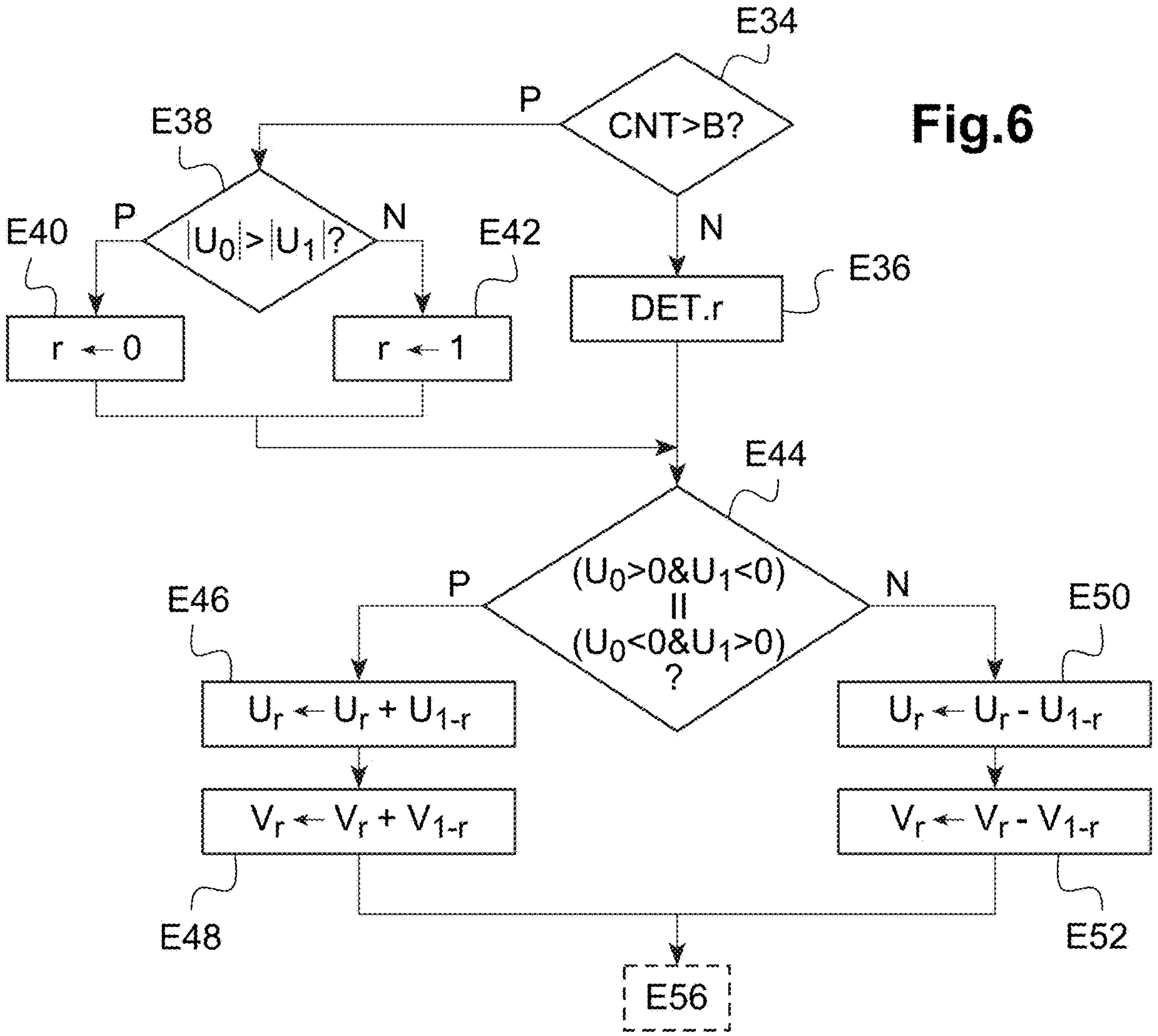
FIG. 6 represents a portion of the method of FIG. 2 including a step of combining variables.

The implementation of steps E26 to E32 (represented in FIG. 5) is optional and the method could therefore, in a variant, be followed directly by step E34 represented in FIG. 6 (in case of negative determination in step E16).

The processor 2 proceeds to step E26 to dividing by 2 the content of the variable A (for example, by shifting a bit towards the right, the binary representation of the variable A), then implements step E28.

During this step E28, the processor 2 determines if the variable A has an even value (i.e. if $A=0 \bmod 2$).

In the positive case (arrow P), the processor 2 proceeds to step E30 to dividing by 2 the content of the variable A (for example, by shifting a bit towards the right, the binary representation of this variable A).

In the negative case (arrow N), the processor 2 first adds the module p to the content of the variable A, then proceeds to dividing by 2 the content (thus modified) of the variable A, for example, by shifting a bit towards the right, the binary representation of this variable A (step E32).

Steps E26 to E32 are dummy steps intended to simulate, when the two first variables $U_0$, $U_1$ are odd (negative results in the tests of steps E6 and E16), the functioning implemented, either in steps E8 to E14, or in steps E18 to E24. During steps E26 to E32, indeed, operations to variable A (dummy variable) of the same type as those used, either in steps E8 to E14, or in steps E18 to E24 are applied.

The content of the variable A is not, however, used at all to determine the modular inverse and can therefore be modified at will, without consequence on the modular inverse determined. A division by 2 of the variable A can moreover thus be made (in practice, a shifting of a bit towards the right of the variable A) in step E26 (to simulate step E8 or step E18) without verifying beforehand, if the content of the variable A is even.

Whatever the result of the test of step E28 (or in case of negative determination in the test of step E16 in the variant where the steps of FIG. 5 are not used), the method is followed by step E34 (see FIG. 6).

The processor 2 determines, in step E34, if the current value of the counter CNT is greater than at a limit B. In practice, the limit B can be predetermined (and in this case, for example, stored in the non-volatile memory 6).

According to a first variant which can be considered, the limit B could be determined (at the start of the method of FIG. 2, for example in step E0) according to the number of bits of the module p.

According to a second variant which can be considered, the limit B could be determined (at the start of the method of FIG. 2, for example in step E0) by random draw, for example within a predetermined range of values.

As explained below, the limit B makes it possible to determine from which iteration, the convergence of the process is accelerated (thanks to steps E38 to E42).

As long as the current value of the counter CNT is less than the limit B (negative determination in step E34), the method continues to step E36 to which the processor 2 determines a binary index r by random draw (from among the value 0 and the value 1).

The method is then followed by step E44 described below.

When the current value of the counter CNT is greater than the limit B (positive determination in step E34), the method is followed by step E38 in which the processor 2 compares the absolute values of the first variables $U_0$, $U_1$. (Indeed, a first variable $U_0$; $U_1$ at least could be negative in some situations following a preceding passage to step E50.)

If the absolute value of the first variable $U_0$ of the first pair is greater than the absolute value of the first variable $U_1$ of the second pair (i.e. $|U_0|>|U_1|$, positive test in step E38), the processor 2 sets the binary index r to 0 (step E40).

If the absolute value of the first variable $U_0$ of the first pair is less than or equal to the absolute value of the first variable $U_1$ of the second pair (i.e. $|U_0|\leq|U_1|$, negative test in step E38), the processor 2 sets the binary index r to 1 (step E42).

Due to steps E46 and E50 described below, it is thus the first variable $U_0$; $U_1$ having the greater absolute value which will be modified in step E46 or E50, specifically with a view to decrease the absolute value thereof, which helps with the convergence of the process.

Whatever the result of the test of step E38, the method is followed by step E44 now described.

The processor 2 determines in step E44 if the first variables $U_0$, $U_1$ have opposite signs, i.e. if $(U_0>0\ \&\ U_1<0)\|(U_0>0)$, where "&" designates the logical operator AND, and "‖" designates the logical operator OR. In practice for instance, the processor 2 determines in step E44 if the product of both first variables $U_0$, $U_1$ is negative.

If so, in step E44 (arrow P), the processor 2 proceeds in step E46 to the combination by addition of the first variable $U_0$ of the first pair and of the first variable $U_1$ of the second pair, and to the storing the result of this combination in the first variable $U_r$ of the pair designated by the binary index r, a binary index of value 0 designating the first pair and a binary index of value 1 designating the second pair.

The first variables $U_0$, $U_1$ here having opposite signs, this combination by addition makes it possible to reduce the absolute value of the modified first variable $U_r$.

The processor 2 also proceed, in this case, to the combination by addition of the second variable $V_0$ of the first pair and of the second variable $V_1$ of the second pair, and to the storing of the result of this combination in the second variable $V_r$ of the pair designated by the binary index r (step E48).

Thanks to the similarity of the processing carried out respectively on the first variables $U_0$, $U_1$ and on the second variables $V_0$, $V_1$ during steps E46 and E48, the relationship $V_r.a=U_r \bmod p$ remains true for the pair (designated by the binary index r) which has just been modified (the relationship $V_{1-r}.a=U_{1-r} \bmod p$ remaining true, also for the other pair, due to it not being modified).

(Here, it is noted that the abovementioned additions are referenced "$U_r+U_{1-r}$" and "$V_r+V_{1-r}$" in FIG. 6 by symmetry with the subtractions of steps E50 and E52 described below, but could, in a variant, be referenced respectively "$U_0+U_1$" and "$V_0+V_1$".)

In the negative in step E44 (arrow N), the processor 2 proceeds in step E50 to the combination by subtraction of the first variable $U_0$ of the first pair and of the first variable $U_1$ of the second pair, and to the storing of the result of this combination in the first variable $U_r$ of the pair designated by the binary index r.

The first variables $U_0$, $U_1$ here being of the same sign (i.e. their product is positive), this combination by subtraction makes it possible to reduce the absolute value of the modified first variable $U_r$.

Specifically, in step E50, the processor 2 subtracts, from the first variable $U_r$ of the pair designated by the binary index r, the first variable $U_{1-r}$ of the other pair: as indicated in FIG. 6, the operation carried out is: $U_r-U_{1-r}$.

The processor 2 also proceeds, in this case, to the combination by subtraction of the second variable $V_0$ of the first pair and of the second variable $V_1$ of the second pair, and to the storing of the result of this combination in the second variable $V_r$ of the pair designated by the binary index r (step E52).

Specifically, in step E52, the processor 2 subtracts, from the second variable $V_r$ of the pair designated by the binary index r, the second variable $V_{1-r}$ of the other pair: $V_r-V_{1-r}$.

Thanks to the similarity of the processing carried out respectively on the first variables $U_0$, $U_1$ and on the second variables $V_0$, $V_1$ during steps E50 and E52, the relationship $V_r.a=U_r \bmod p$ remains true for the pair (designated by the binary index r) which has just been modified (the relationship $V_{i-r}.a=U_{1-r} \bmod p$ remaining true, also for the other pair due to the fact that it is not modified).

It is reminded that, as long as the current value of the counter CNT has not reached the limit B, the binary index r (which designates the pair modified during steps E46 and 48, or E50 and E52) is determined randomly (in step E36 described above).

Thus, the sequence of the variables successively modified during different iterations is different from one implementation to another of the method of FIG. 2, such that an attacker cannot deduce the values handled from the repeated observation of the implementation of the method.

Whatever the result of the test in step E44, the method continues in step E56 (represented in FIG. 2), in which the processor increments the counter CNT.

As long as neither the first variable $U_0$ of the first pair, nor the first variable $U_1$ of the second pair equals 0 (test of step E58), the method loops in step E6 to implement a new iteration.

Thus, the method of FIG. 2 comprises a plurality of iterations each including a division by two of the first variable $U_0$ of the first pair (step E8, FIG. 3), or a division by two of the first variable $U_1$ of the second pair (step E18, FIG. 4), or even a combination of the first variable $U_0$ of the first pair and of the first variable $U_1$ of the second pair (FIG. 6) by addition (step E46) or by subtraction (step E50).

In a variant, each iteration could comprise several operations from among: a division by two of the first variable $U_0$ of the first pair, a division by two of the first variable $U_1$ of the second pair, a combination of the first variable $U_0$ of the first pair and of the first variable $U_1$ of the second pair by addition or by subtraction.

Figure 3:
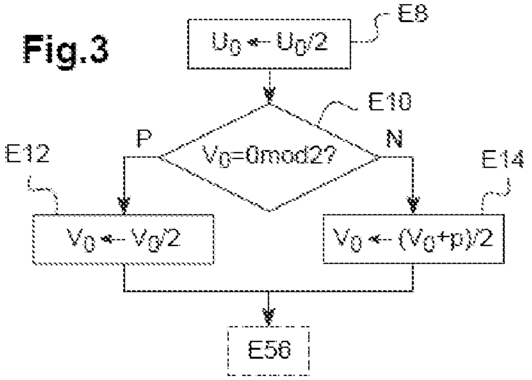
FIG. 3 represents a portion of the method of FIG. 2 including a step of dividing by two.
Figure 4:
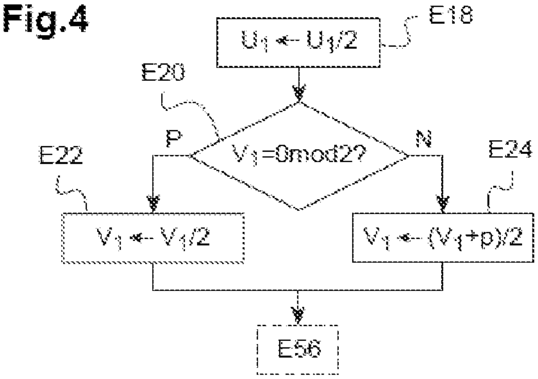
FIG. 4 represents a portion of the method of FIG. 2 including another step of dividing by two.

In particular, it can be provided, that each iteration comprises:

as long as the first variable $U_0$ of the first pair has an even value, a repetition of the steps of FIG. 3, each time including a division by two of the first variable $U_0$ of the first pair;

as long as the first variable $U_1$ of the second pair has an even value, a repetition of the steps of FIG. 4, each time including a division by two of the first variable $U_1$ of the second pair;

the steps of FIG. 6, including a combination of the first variable $U_0$ of the first pair and of the first variable $U_1$ of the second pair by addition or by subtraction.

As explained above (whatever the embodiment), at the end of each iteration, the following relationships are maintained:

$V_0.a=U_0 \bmod p$ and $V_i.a=U_1 \bmod p$.

When the first variable $U_0$ of the first pair or the first variable $U_1$ of the second pair is zero (negative determination in the test of step E58), the method continues in step E60, in which the processor 2 determines if the first variable $U_0$ of the first pair is zero.

If so, (arrow P), the processor 2 sets an index i to the value 1 (step E62). In the negative (arrow N), the processor 2 sets an index i to the value 0 (step E64). The index i thus designates the pair of which the first variable $U_i$ is non-zero (and in this case equals 1 as an absolute value).

The processor 2 thus determines in step E66 if the first variable $U_i$ of the pair designated by the index i equals −1, in which case the processor 2 determines the value $p-V_i$ (i.e. the result obtained by subtracting the second variable $V_i$ designated by the index i from the module p) and stores the value thus determined in the second variable $V_i$ designated by the index i (overwriting the preceding value).

Thus, in any case, the following is achieved: $V_i.a=1 \bmod p$.

The processor 2 can thus determine in step E70 the value of the modular inverse sought ($a^{-1}$) by applying to the second variable of the pair designated by the index i, the operation of the remainder of module p: $a^{-1}=V_i \bmod p$.

The invention claimed is:

1. A method of implementing a cryptographic algorithm using a modular inverse of a number, the method comprising:

storing cryptographic data including the number at an electronic entity;

applying, at the electronic entity, successive iterations to two pairs each comprising a first variable and a second variable such that at an end of each iteration and for each pair, a product of the second variable and said number is equal to the first variable modulo a given module, the two pairs comprising a first pair and a second pair, each of the iterations including at least one division of the first variable of the first pair or of the second pair by two, or a combination of the first variable of the first pair and of the first variable of the second pair by addition or subtraction, at least some of the iterations including a combination by addition or subtraction comprising modifying the first variable of a pair determined randomly from among the first pair and the second pair by a result of the combination;

after the iterations are performed, determining the modular inverse of the number using the second variable of the first pair or the second variable of the second pair;

implementing the cryptographic algorithm using the determined modular inverse; and one of (i) transmitting a result of the implemented cryptographic algorithm to another electronic entity, and (ii)

storing the result of the implemented cryptographic algorithm in a memory of the electronic entity.

2. The method according to claim 1, wherein, when the number of iterations performed is greater than a threshold, each of the iterations including a combination by addition or subtraction comprises modifying one of the first variable of the first pair and the first variable of the second pair having the greater absolute value by the result of the combination.

3. The method according to claim 2, further comprising determining the threshold by random draw.

4. The method according to claim 1, wherein, for at least one of the iterations comprising the combination by addition or subtraction, the combination is made by addition when the first variable of the first pair and the first variable of the second pair have opposite signs, and by subtraction when the first variable of the first pair and the first variable of the second pair have the same sign.

5. The method according to claim 1, wherein each of the iterations comprising a division of the first variable of a given pair by two comprises, when the second variable of said given pair is even, dividing the second variable of said given pair by two, and when the second variable of said given pair is odd, determining a sum of the second variable of said given pair and of the module, and dividing said sum by two.

6. The method according to claim 1, further comprising modifying an additional variable by a random value, wherein, in at least one iteration, when the additional variable is even, performing a division of the additional variable by two, and when the additional variable is odd, determining a sum of the additional variable and the module, and performing a division of said sum by two.

7. The method according to claim 1, wherein each of the iterations including the combination by addition or subtraction comprises a corresponding combination of the second variable of the first pair and of the second variable of the second pair.

8. The cryptographic processing device according to claim 1, wherein the number is one of (i) a public exponent of the public key of an asymmetric encryption scheme, (ii) a secret factor of an RSA algorithm module, (iii), a scalar number, and (iv) a multiplicative mask.

9. The method according to claim 2, wherein, for at least one of the iterations comprising the combination by addition or subtraction, the combination is made by addition when the first variable of the first pair and the first variable of the second pair have opposite signs, and by subtraction when the first variable of the first pair and the first variable of the second pair have the same sign.

10. The method according to claim 2, wherein each of the iterations comprising a division of the first variable of a given pair by two comprises, when the second variable of said given pair is even, dividing the second variable of said given pair by two, and when the second variable of said given pair is odd, determining a sum of the second variable of said given pair and of the module, and dividing said sum by two.

11. The method according to claim 2, further comprising modifying an additional variable by a random value, wherein, in at least one iteration, when the additional variable is even, performing a division of the additional variable by two, and when the additional variable is odd, determining a sum of the additional variable and the module, and performing a division of said sum by two.

12. The method according to claim 2, wherein each of the iterations including the combination by addition or subtraction comprises a corresponding combination of the second variable of the first pair and of the second variable of the second pair.

13. The method according to claim 3, wherein, for at least one of the iterations comprising the combination by addition or subtraction, the combination is made by addition when the first variable of the first pair and the first variable of the second pair have opposite signs, and by subtraction when the first variable of the first pair and the first variable of the second pair have the same sign.

14. The method according to claim 3, wherein each of the iterations comprising a division of the first variable of a given pair by two comprises, when the second variable of said given pair is even, dividing the second variable of said given pair by two, and when the second variable of said given pair is odd, determining a sum of the second variable of said given pair and of the module, and dividing said sum by two.

15. The method according to claim 3, further comprising modifying an additional variable by a random value, wherein, in at least one iteration, when the additional variable is even, performing a division of the additional variable by two, and when the additional variable is odd, determining a sum of the additional variable and the module, and performing a division of said sum by two.

16. The method according to claim 3, wherein each of the iterations including the combination by addition or subtraction comprises a corresponding combination of the second variable of the first pair and of the second variable of the second pair.

17. A cryptographic processing device, comprising:

a memory configured to store cryptographic data including a number; and at least one processor configured to:

determine a modular inverse of the number stored in the memory by applying successive iterations to two pairs each comprising a first variable and a second variable such that at an end of each iteration and for each pair, a product of the second variable and said number is equal to the first variable modulo a given module, the two pairs comprising a first pair and a second pair, the at least one processor being configured to activate, at each of the iterations, at least one division block for dividing by two the first variable of the first pair or of the second pair, or a combination block for combining the first variable of the first pair and the first variable of the second pair by addition or subtraction, the at least one processor being configured, for at least some of the iterations, to modify the first variable of a pair determined randomly from among the first pair and the second pair by a result of the combination, after the iterations are performed, determine the modular inverse of the number using the second variable of the first pair or the second variable of the second pair, implement the cryptographic algorithm using the determined modular inverse, and one of (i) transmit a result of the implemented cryptographic algorithm to another cryptographic processing device, and (ii) store the result of the implemented cryptographic algorithm in the memory.

18. The cryptographic processing device according to claim 17, wherein the at least one processor is configured to, when the number of iterations performed is greater than a threshold, modify one of the first variable of the first pair and the first variable of the second pair having the greater absolute value by the result of the combination.

19. The cryptographic processing device according to claim 18, wherein the combination block performs the combination by addition when the first variable of the first pair and the first variable of the second pair have opposite signs, and by subtraction when the first variable of the first pair and the first variable of the second pair have the same sign.

20. The cryptographic processing device according to claim 17, wherein the combination block performs the combination by addition when the first variable of the first pair and the first variable of the second pair have opposite signs, and by subtraction when the first variable of the first pair and the first variable of the second pair have the same sign.

* * * * *